(12) United States Patent
Park et al.

(10) Patent No.: US 11,417,326 B2
(45) Date of Patent: Aug. 16, 2022

(54) HUB-DIALOGUE SYSTEM AND DIALOGUE PROCESSING METHOD

(71) Applicants: Hyundai Motor Company, Seoul (KR); Kia Motors Corporation, Seoul (KR)

(72) Inventors: Youngmin Park, Gunpo-si (KR); Seona Kim, Seoul (KR); Jeong-Eom Lee, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 127 days.

(21) Appl. No.: 16/691,179

(22) Filed: Nov. 21, 2019

(65) Prior Publication Data

US 2021/0027775 A1 Jan. 28, 2021

(30) Foreign Application Priority Data

Jul. 24, 2019 (KR) .................. 10-2019-0089686

(51) Int. Cl.
 *G10L 15/22* (2006.01)
 *G10L 15/18* (2013.01)
(52) U.S. Cl.
 CPC .......... *G10L 15/22* (2013.01); *G10L 15/1815* (2013.01); *G10L 2015/223* (2013.01)
(58) Field of Classification Search
 CPC .................. G10L 15/22; G10L 15/1822; G10L 2015/223
 See application file for complete search history.

(56) References Cited

U.S. PATENT DOCUMENTS

| | | | | |
|---|---|---|---|---|
| 6,339,706 B1* | 1/2002 | Tillgren | ................ | G10L 15/26 |
| | | | | 455/419 |
| 9,916,839 B1* | 3/2018 | Scalise | ................ | G06F 3/167 |
| 10,580,405 B1* | 3/2020 | Wang | ................ | G10L 17/22 |
| 2012/0078635 A1* | 3/2012 | Rothkopf | ................ | G10L 15/30 |
| | | | | 704/270.1 |
| 2013/0339031 A1* | 12/2013 | Yoon | ................ | H04N 21/42203 |
| | | | | 704/275 |

FOREIGN PATENT DOCUMENTS

WO WO-2019145769 A1 * 8/2019 ............. G10L 15/22

* cited by examiner

*Primary Examiner* — Daniel C Washburn
*Assistant Examiner* — Athar N Pasha
(74) *Attorney, Agent, or Firm* — Slater Matsil, LLP

(57) ABSTRACT

A hub-dialogue system includes a speech processor configured to determine a user intention that is included in inputted user dialogue. A communicator is configured to connect a local speaker corresponding to an external dialogue system through wireless communication. A controller is configured to determine the external dialogue system corresponding to the user intention from among a plurality of external dialogue systems, to generate a command sentence indicating the user intention, to convert the command sentence to a voice signal, and to control the communicator to transmit the voice signal to the local speaker corresponding to the determined external dialogue system.

20 Claims, 10 Drawing Sheets

FIG. 4

| DOMAIN | LOCAL SPEAKER | EXTERNAL DIALOGUE SYSTEM |
|---|---|---|
| AIR CONDITIONER | S_A | EXTERNAL DIALOGUE SYSTEM A |
| TV | S_B | EXTERNAL DIALOGUE SYSTEM B |
| ROBOT CLEANER | S_A | EXTERNAL DIALOGUE SYSTEM A |
| WASHING MACHINE | S_B | EXTERNAL DIALOGUE SYSTEM B |
| LIGHT | S_C | EXTERNAL DIALOGUE SYSTEM C |
| COMPUTER | S_D | EXTERNAL DIALOGUE SYSTEM D |
| ⋮ | ⋮ | ⋮ |

FIG. 5

| USER INTENTION | COMMAND STATEMENT |
|---|---|
| AIR CONDITIONER_ON | TURN ON AIR CONDITIONER |
| AIR CONDITIONER_OFF | TURN OFF AIR CONDITIONER |
| WASHING MACHINE_RUN (STANDARD MODE) | RUN WASHING MACHINE IN STANDARD MODE |
| LIVING ROOM LIGHT_ON | TURN ON LIVING ROOM LIGHT |
| LIVING ROOM LIGHT_OFF | TURN OFF LIVING ROOM LIGHT |
| ⋮ | ⋮ |

HUB-DIALOGUE SYSTEM AND DIALOGUE PROCESSING METHOD

CROSS-REFERENCE TO RELATED APPLICATIONS

This application claims priority to Korean Patent Application No. 10-2019-0089686, filed in the Korean Intellectual Property Office on Jul. 24, 2019, which application is hereby incorporated herein by reference.

TECHNICAL FIELD

Embodiments of the present disclosure relate to a hub-dialogue system and dialogue processing method.

BACKGROUND

A dialogue system is a system that can recognize a user's speech and provide a service corresponding to the recognized speech. Recently, various kinds of conversation services have been provided using the dialogue system. In particular, various IoT (internet of things) devices are linked to the dialogue system. By analyzing the speech, the IoT device can be controlled according to the user's intention.

However, these dialogue systems have a closed aspect of accessibility. That is, only a dialogue system provided by a company that sells IoT devices or a company affiliated with a company that sells IoT devices can control the IoT device, so the user remembers which dialogue system is linked to the IoT device to be controlled, and the user must utter the caller of the dialogue system and the appropriate commands for that dialogue system. This is a factor that lowers the user's convenience.

SUMMARY

Embodiments of the present disclosure relate to a hub-dialogue system, controlling method of hub-dialogue system, and an electronic apparatus capable of communicating with a user.

It is an aspect of the disclosure to provide a hub-dialogue system, a hub-dialogue system control method, and an electronic apparatus for processing a user utterance in one hub-dialogue system to generate and output a command sentence suitable for an external dialogue system linked to the device to be controlled by the user.

In accordance with embodiments of the disclosure, a hub-dialogue system includes a speech processor configured to determine user intention included in inputted user dialogue when the user dialogue is inputted. A communicator is configured to connect at least one local speaker corresponding to at least one external dialogue systems through wireless communication. A controller is configured to determine an external dialogue system corresponding to the user intention among the at least one external dialogue systems, generate a command sentence indicating the user intention, to convert the command sentence to voice signal, and to control the communicator to transmit the voice signal to a local speaker corresponding to the determined external dialogue system.

Further, the at least one local speaker may be provided at a position where the voice signal output from the at least one local speaker can be input to a microphone of the corresponding external dialogue system.

Further, the hub-dialogue system may further include a storage configured to match and store the command sentence indicating the user intention for at least one user intention.

Further, the controller may convert a user dialogue for registering the command sentence to the voice signal, and transmit the voice signal to the local speaker.

Further, the communicator may be connected with at least one local microphone corresponding to the at least one external dialogue system, and may receive a system response outputted from the at least one external dialogue system from the at least one local microphone.

Further, the controller may determine whether the voice signal is recognizable by the at least one external dialogue system based on the inputted system response.

Further, the controller may request user dialogue again when the voice signal is not recognizable by the at least one external dialogue system.

Further, the controller may convert re-inputted user dialogue into the voice signal, and transmits the voice signal to the local speaker by controlling the communicator.

Further, the controller may store a sentence included in the user dialogue as command sentence corresponding to the user intention when the voice signal is recognizable by the at least one external dialogue system.

Further, the controller may request to a user command sentence indicating the user intention, and store the command sentence inputted by the user by matching the user intention when registering the at least one external dialogue system with the hub-dialogue system.

Another aspect of the present disclosure a controlling method for a hub-dialogue system. The method includes determining user intention included in an inputted user dialogue when the user dialogue inputted, determining an external dialogue system corresponding to the user intention among the at least one external dialogue system registered in the hub-dialogue system, generating a command sentence indicating the user intention, converting the command sentence into a voice signal, and transmitting the voice signal to a local speaker corresponding to the determined external dialogue system.

Further, the at least one local speaker may be provided at a position where the voice signal output from the at least one local speaker can be input to a microphone of the corresponding external dialogue system.

Further, the method may further include matching and storing the command sentence indicating the user intention for at least one user intention.

Further, the method may further include converting a user dialogue for registering the command sentence to the voice signal and transmitting the voice signal to the local speaker.

Further, the method may further include receiving a system response outputted from the at least one external dialogue system from the at least one local microphone corresponding to the at least one external dialogue system.

Further, the method may further include determining whether the voice signal is recognizable by the at least one external dialogue system based on the inputted system response.

Further, the method may further include requesting user dialogue again when the voice signal is not recognizable by the at least one external dialogue system.

Further, the method may further include converting re-inputted user dialogue into the voice signal, and transmitting the voice signal to the local speaker by controlling the communicator.

Further, the method may further include storing a sentence included in the user dialogue as command sentence corresponding to the user intention when the voice signal is recognizable by the at least one external dialogue system.

Further, matching and storing the command sentence indicating the user intention for at least one user intention may comprise requesting to a user command sentence indicating the user intention, and storing the command sentence inputted by the user by matching the user intention when registering the at least one external dialogue system with the hub-dialogue system.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 4 and 5 are diagrams illustrating examples of information stored in a storage unit of a hub-dialogue system according to an exemplary embodiment.

Figure 1:
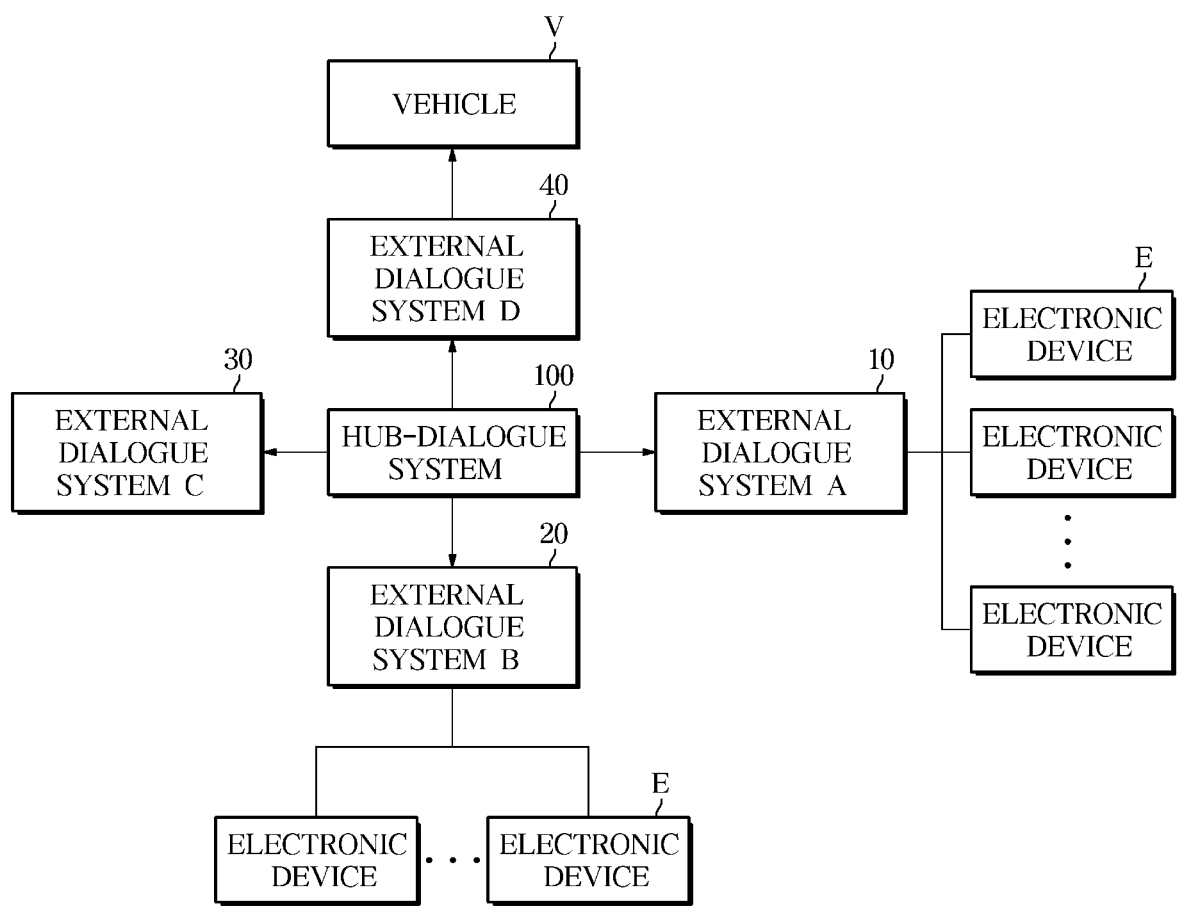
FIG. 1 is a diagram illustrating a relationship between a hub-dialogue system and another external dialogue system in accordance with embodiments of the present disclosure.

The following reference symbols can be used in conjunction with the drawings:
100: dialogue system
110: speech processor
120: controller
130: communicator
140: storage
S: local speaker
M: local microphone
10, 20, 30, 40: external dialogue system
200: user terminal

DETAILED DESCRIPTION OF ILLUSTRATIVE EMBODIMENTS

Configurations shown in the embodiments and drawings described herein is a preferred example of the disclosure, there may be various modifications that can replace the embodiments and drawings of the present specification at the time of filing of the present application.

Also, the terminology used herein is for the purpose of describing particular embodiments only and is not intended to be limiting of the disclosure. Singular expressions include plural expressions unless the context clearly indicates otherwise. As used herein, the terms "comprise", "comprise" or "have" are intended to designate that the features, numbers, steps, actions, components, parts, or combinations thereof described in the specification are present, and it does not preclude the existence or addition of one or more other features or numbers, steps, operations, components, parts or combinations thereof in advance.

In addition, terms such as "~ part", "~ group", "~ block", "~ member", "~ module" may refer to a unit for processing at least one function or operation. For example, the terms may refer to at least one hardware processed by at least one piece of hardware such as a field-programmable gate array (FPGA)/application specific integrated circuit (ASIC), at least one software stored in a memory, or a processor.

The references attached to the steps are used to identify the steps. These references do not indicate the order between the steps. Each step is performed in a different order than the stated order unless the context clearly indicates a specific order.

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

Computer-readable recording media include all kinds of recording media having stored thereon instructions which can be read by a computer. For example, there may be a read only memory (ROM), a random access memory (RAM), a magnetic tape, a magnetic disk, a flash memory, an optical data storage device, and the like.

Hereinafter, an embodiment of a hub-dialogue system, a control method of a hub-dialogue system, and an electronic apparatus according to an aspect will be described in detail with reference to the accompanying drawings.

FIG. 1 is a diagram illustrating a relationship between a hub-dialogue system and another external dialogue system in accordance with embodiments of the present disclosure.

In this embodiment, other dialogue systems except the hub-dialogue system 100 according to an embodiment will be referred to as an external dialogue system.

According to the example of FIG. 1, the external dialogue system A 10 is interworked with a plurality of electronic devices E to process user utterances for controlling the plurality of electronic devices E, and the plurality of electronic devices E may be controlled according to the user's intention included in the user's speech.

A plurality of electronic devices linked to the external dialogue system A 10 are connected to the external dialogue system A 10 via the Internet to form a network, which may also be referred to as IoT (Internet of Things) devices.

The plurality of electronic devices E linked to the external dialogue system A 10 may be selected from home appliances such as a washing machine, a refrigerator, an air conditioner, a TV, an air cleaner, a robot cleaner, a PC, and the like.

Here, the fact that the electronic device is linked to the dialogue system means the electronic device is registered in the dialogue system and the user utters a command for controlling the electronic device, and the electronic device may be in a state in which a control signal corresponding to the command is transmitted to the electronic device. The same explanations may apply to other dialogue systems.

The external dialogue system B (20) also interworks with a plurality of electronic devices (E) to process user utterances for controlling the plurality of electronic devices (E), and the plurality of electronic devices E may be controlled according to the user's intention included in the user's speech.

The plurality of electronic devices E linked to the external dialogue system B 20 may be different types of electronic devices E than the plurality of electronic devices E linked to the external dialogue system A 10. For example, the plurality of electronic devices E linked to the external dialogue system A 10 include a washing machine and an air conditioner, and the plurality of electronic devices E interlinked with the external dialogue system B 20 may include a robot cleaner and a refrigerator.

However, the embodiment of the hub-dialogue system 100 is not limited thereto, and electronic devices linked to different external dialogue systems may partially overlap.

The external dialogue system C 30 may provide information requested by the user without interworking with the electronic device. For example, external dialogue system C 30 may include a search server or may be connected to an external search server to retrieve information requested by a user from the search server.

In addition, the external dialogue system D 40 is linked with the vehicle V to process the user utterance for controlling the vehicle V, and the control signal may be transmitted to the vehicle V according to the user's intention included in the user's speech.

As described above, the devices connected to each of the external dialogue systems 10, 20, 30, and 40 are different, and callers for activating a conversation service are also different. There are also differences in the command sentences that can be recognized for device control. therefore, if the user does not use the hub-dialogue system 100 to be described later, the user is asked which dialogue system the device to be controlled is linked to, what is the caller of the dialogue system, remember all the appropriate command sentences in the dialogue system, and then each time you control the device, the user must enter the utterance using the appropriate caller and the appropriate command sentence in the corresponding dialogue system.

However, according to the hub-dialogue system 100 according to an embodiment, the user only needs to input a speech to receive a desired service without worrying about which dialogue system the device to be controlled is linked to, the hub-dialogue system 100 may select an external dialogue system capable of providing a service desired by the user, and generate and enter an appropriate command sentence in the selected external dialogue system.

Figure 2:
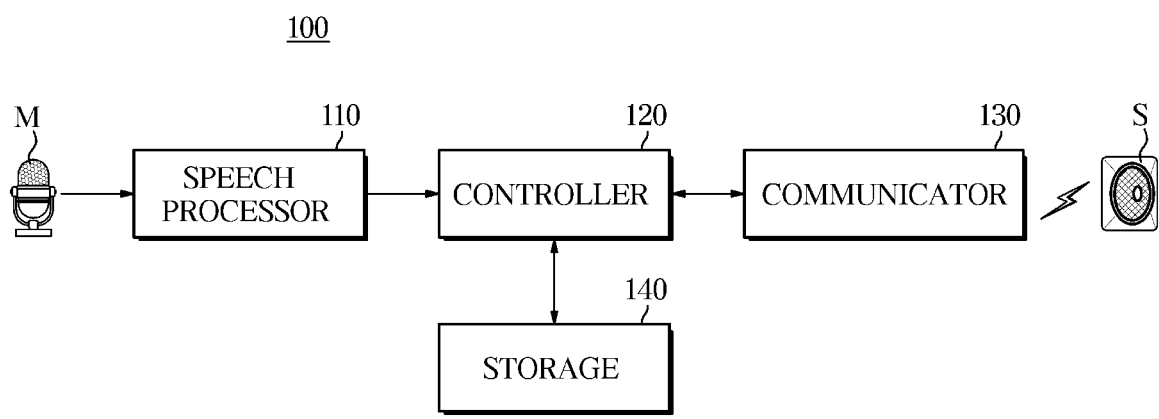
FIG. 2 is a control block diagram illustrating a hub-dialogue system in accordance with embodiments of the present disclosure.
Figure 3:
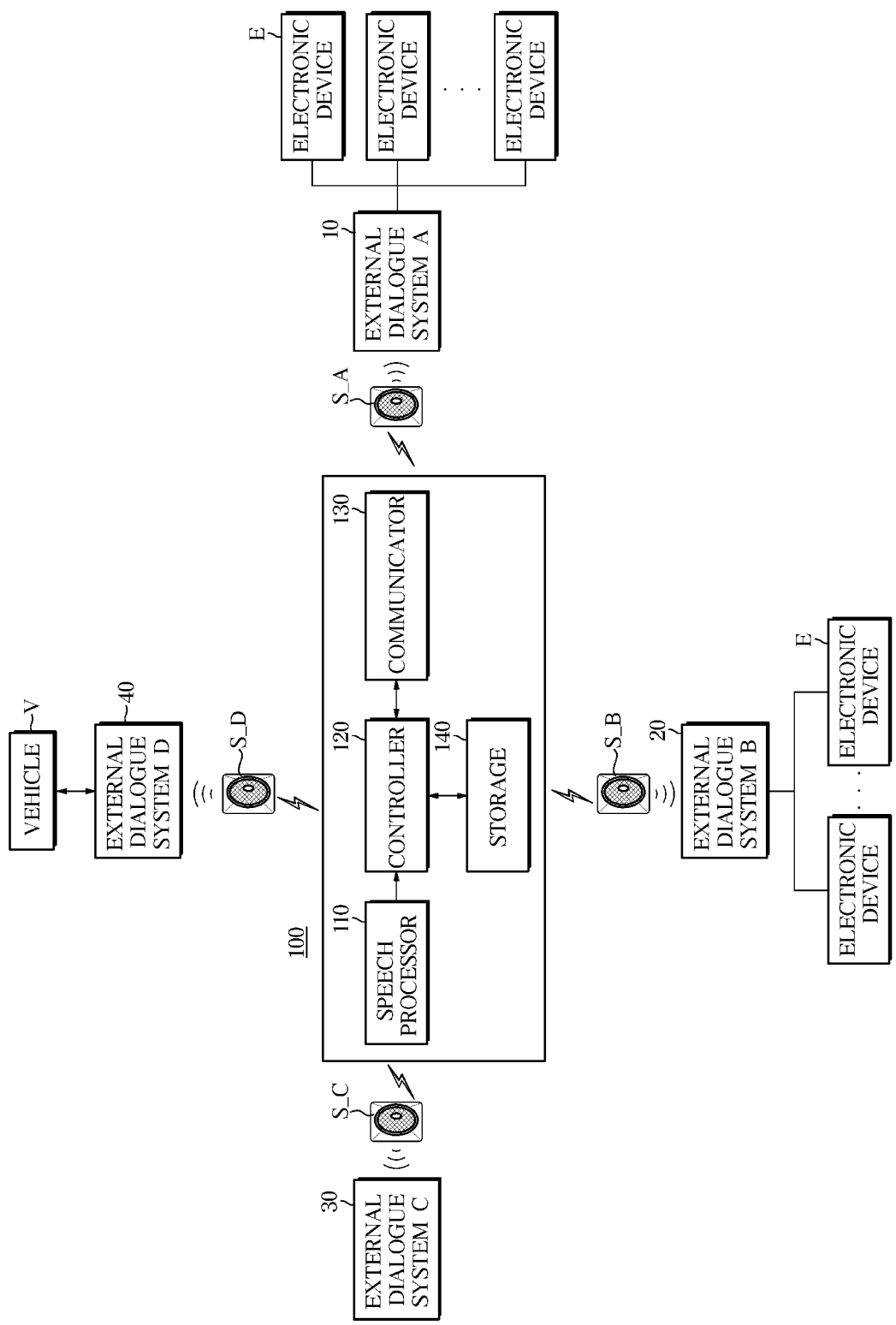
FIG. 3 is a diagram illustrating a method of connecting a hub-dialogue system to an external dialogue system in accordance with embodiments of the present disclosure.

FIG. 2 is a control block diagram illustrating a hub-dialogue system in accordance with embodiments of the present disclosure, and FIG. 3 is a diagram illustrating a method of connecting a hub-dialogue system to an external dialogue system in accordance with embodiments of the present disclosure.

Referring to FIG. 2, according to an embodiment, the hub-dialogue system 100 may include a speech processor 11*o* that determines a user intention included in the input user speech when a user speech is input; a communicator 130 connected in wireless communication with at least one local speaker corresponding to at least one external dialogue system; and a controller 120 for controlling the communicator 130 to transmit a voice signal to (S) determining an external dialogue system corresponding to the user intention from among at least one external dialogue system, generating a command sentence indicating the user intention, converting the generated command sentence into a voice signal, and transmitting the voice signal to a local speaker corresponding to the determined external dialogue system. In addition, the hub-dialogue system 100 may include a storage 140 configured to store various types of information necessary for performing the operation of the hub-dialogue system 100.

The user may access the hub-dialogue system 100 through the user terminal. The user may input user speech into a microphone provided in the user terminal to request a desired service.

The user terminal may be a mobile device such as a smart phone, a PC or an AI speaker, or may be a vehicle. It only needs to be able to receive the user's speech and deliver it to the hub-dialogue system 100, and there are no other restrictions on the type of user terminal.

The speech processor 110 may include a speech to text (STT) engine that converts user speech input through a microphone into text and a conversation manager that analyzes text and determines user intention included in the user speech.

Specifically, the speech manager converts an input string into a morpheme by performing morphological analysis on the user speech in text form. The speech manager can also recognize the entity name from the user's speech. The entity name is a proper noun such as a person's name, place name, organization name, time, date, currency, etc. The entity name recognition is the task of identifying the entity name in the sentence and determining the type of the entity name identified. By recognizing individual names, we can extract important keywords from sentences to understand the meaning of sentences.

The speech manager can extract domains from user speech. The domain can identify the subject of the language spoken by the user. For example, the type of the device to be controlled may be the domain. Therefore, electronic devices such as a refrigerator, an air conditioner, a TV, a robot cleaner, an air purifier, a washing machine, and a PC may be domains. In addition, domains including various topics such as text, navigation, schedule, weather, traffic, vehicle control, etc. may be database and stored in the storage 140.

The speech manager can analyze the speech acts of user speech. Speech act analysis is to analyze the intention of the user's speech, and to grasp the intention of the speech such as whether the user asks a question, makes a request, makes a response, or expresses a simple emotion.

The speech manager may grasp the user's intention based on information such as domain, entity name, speech act, etc. corresponding to the user's speech, and extract an action corresponding to the user's intention. An action may be defined by an object and an operator.

For example, if the identified user intention is [operate an air conditioner], the corresponding action may be defined as "air conditioner (object)_on(operator)", and if the identified user intention is [operate a robot cleaner]. The corresponding action may be defined as "robot cleaner (object)_execution(operator)".

The controller 120 may determine an external dialogue system corresponding to the user intention determined by the speech processor 110 among the plurality of external dialogue systems 10, 20, 30, and 40. However, here, the number of external dialogue systems is based on the example of FIG. 1 described above, and it is of course possible to use fewer or more external dialogue systems.

The controller 120 can determine an external dialogue system that can provide a desired service. Detailed description thereof will be described later.

The controller 120 may generate a command sentence indicating a user's intention and convert the generated command sentence into a voice signal. The command sentence indicating the user intention may be a sentence recognizable by an external dialogue system capable of providing a service desired by the user. For example, if the user utterance is not a language that the external dialogue system can recognize, the command sentence may be generated in a language that the external dialogue system can recognize. If the user utterance includes a recognizable sentence in an external dialogue system capable of providing a service desired by the user, the sentence may be converted into a voice signal as it is.

The controller 120 may include a Text to Speech TTS engine to convert command sentences into voice signals. The TTS engine may convert the generated command sentence into a voice signal, and the communicator 130 may transmit a voice signal to the local speaker S corresponding to the external dialogue system determined above.

Referring to FIG. 3, a local speaker corresponding to each external dialogue system may be provided.

For example, the external dialogue system A 10 may be provided with a local speaker A S_A corresponding thereto, the external dialogue system B 20 may be provided with a local speaker B S_B corresponding thereto, and the external dialogue system C. The local speaker C S_C corresponding thereto may be provided at 30, and the local speaker D S_D corresponding thereto may be provided at the external dialogue system D 40.

As described above, each external dialogue system is provided with a microphone for connecting with the user, just as the user uses a microphone provided in the user terminal to access the hub-dialogue system 100.

Therefore, the hub-dialogue system 100 according to an embodiment may include a local speaker S provided at a position corresponding to a microphone of each external dialogue system. Here, the position corresponding to the microphone of the external dialogue system may mean a position where the voice signal output from the local speaker S may be input to the microphone of the external dialogue system.

Specifically, the local speaker A S_A corresponding to the external dialogue system A 10 is disposed at a position where a voice signal output from the local speaker A S_A can be input to the microphone of the external dialogue system A 10. The local speaker B S_B corresponding to the external dialogue system B 20 is disposed at a position where a voice signal output from the local speaker B S_B can be input to the microphone of the external dialogue system B 20. The local speaker C S_C corresponding to the external dialogue system C 30 is disposed at a position where a voice signal output from the local speaker S_C can be input to the microphone of the external dialogue system C 30. The local speaker S_D corresponding to the external dialogue system D 40 may be disposed at a position where a voice signal output from the local speaker D S_D may be input to a microphone of the external dialogue system D 40.

For example, if the service the user wants, specifically, the user intention is the control of the air conditioner, the user only needs to input a user utterance for controlling the air conditioner to the hub-dialogue system 100 regardless of what is the external dialogue system linked to the air conditioner, and then the external dialogue system in which the hub-dialogue system 100 is linked with the air conditioner may be determined to be the external dialogue system A 10. The hub-dialogue system 100 generates command sentences recognizable in external dialogue system A 10, by converting it into a voice signal and outputting it to the local speaker A S_A, and therefore the effect is as if the user uttered a command sentence in the microphone of the external dialogue system A 10.

In this manner, the hub-dialogue system 100 may control various devices linked with other external dialogue systems according to user intention, even though there is no separate partnership or contract relationship with other external dialogue systems.

FIGS. 4 and 5 are diagrams illustrating examples of information stored in a storage unit of a hub-dialogue system according to an exemplary embodiment.

The storage 140 may store information used by the controller 120 to determine an external dialogue system corresponding to a user's intention. As described above, the speech processor 110 may determine a user's intention included in the user's speech and extract a domain, an action, or the like corresponding to the user's intention.

In the storage 140, information of an external dialogue system corresponding to the domain and information of a local speaker corresponding to the external dialogue system may be matched and stored for each domain.

According to the example of FIG. 4, in the domain "air conditioner", information about an external dialogue system A 10 interworking with an air conditioner and information about a local speaker A S_A assigned to the external dialogue system A 10 are matched and stored. The information about the local speaker A S_A may include a serial number of the local speaker A S_A, an IP address, and the like.

In the domain "TV", information about an external dialogue system B 20 linked to a TV and information about a local speaker B S_B allocated to an external dialogue system B 20 may be matched and stored.

In the domain "robot cleaner", information about an external dialogue system A 10 linked to a robot cleaner and information about a local speaker A S_A allocated to the external dialogue system A 10 may be matched and stored.

In the domain "washing machine", information about an external dialogue system B 20 linked to a washing machine and information about a local speaker B S_B allocated to the external dialogue system B 20 may be matched and stored.

In the domain "light", information about an external dialogue system C 30 linked to a light and information about a local speaker C S_C allocated to the external dialogue system C 30 may be matched and stored.

In the domain "computer", information about an external dialogue system D 40 linked to a computer and information about a local speaker D S_D allocated to the external dialogue system D 40 may be matched and stored.

The same description can be applied to the remaining domains.

In addition, the storage 140 may store information used by the controller 120 to generate a command sentence indicating a user intention. In detail, the storage 140 may match and store command sentences indicating corresponding user intentions for each user intention. Here, the command sentence indicating the user intention may be generated in the form of a sentence recognizable in an external dialogue system corresponding to the user intention.

In this example, the user's intention will be displayed as an action corresponding thereto.

According to the example of FIG. 5, The command sentence corresponding to the user intention "Air conditioner_ON" is stored as "turn on the air conditioner" and the command sentence corresponding to the user intention "Air conditioner_OFF" is stored as "turn off the air conditioner." The command sentence corresponding to the user's intention "washing machine execution (standard mode)" is stored as in the "operate in the washing machine standard mode." The command sentence corresponding to user's intention "Turn on the living room light" is stored as "Living room light_ON" and the command sentence corresponding to the user intention "Living Room Light_OFF" is stored as "Turn off Living Room Light".

For example, if the user speech input to the hub-dialogue system 100 is "too hot," the speech processor 110 may determine that the user intention included in the user speech is [air conditioning execution], therefore the corresponding domain may be "air conditioner" and the action may be "air conditioner_ON".

As illustrated in FIG. 4, the controller 120 determines the external dialogue system A 10 as an external dialogue system corresponding to a user's intention, based on the information stored in the storage 140 and generates a command sentence "turn on the air conditioner" indicating a user's intention based on the information shown in FIG. 5.

The controller 120 converts the "turn on the air conditioner" to the voice signal using the TI'S engine, and transmits the "turn on the air conditioner" voice signal to the local speaker A S_A through the communicator 130.

Local speaker A S_A can output the voice signal "turn on the air conditioner" and input it to the microphone of external dialogue system A 10.

On the other hand, each external dialogue system may have a caller to activate the corresponding dialogue system. Therefore, the storage 140 can match and store call words for each external dialogue system. and also, the storage 140 can also match and save the call words of the external dialogue system corresponding to each domain, also, the storage 140 can match and store the corresponding caller of the external dialogue system for each user's intention. There is no limit on where to match and store callers.

The controller 120 can add the caller of the external dialogue system before the command sentence. Therefore, the user only needs to utter the caller of the hub-dialogue system 100, and does not have to remember or utter the caller necessary for each desired service.

The hub-dialogue system 100 according to an embodiment may include at least one memory for storing a program and related data for performing the above-described operations and the below-described operations, and at least one processor for executing a stored program.

It is also possible for the speech processor 110 and the controller 120 to use separate memories and processors, and some or all of them may share the memories and the processors.

It is also possible for the TI'S engine of the controller 120 to use separate memory and processor.

In addition, the storage 140 may include nonvolatile memory such as read only memory (ROM), erasable programmable read only memory (EPROM), electrically erasable programmable read only memory (EEPROM), flash memory, and the like, and it may further include volatile memory such as static random access memory (SRAM) and dynamic random access memory (DRAM). Depending on the type of information to be stored, it may be stored in the nonvolatile memory or may be stored in the volatile memory. For example, the information illustrated in FIGS. 4 and 5 described above may be stored in a nonvolatile memory.

The storage 140 may share memory with the speech processor 110 and the controller 120 or may use separate memory.

The communicator 130 may include at least one of various wireless communication modules to exchange signals with the user terminal 200 (refer to FIG. 6) and the local speaker S through wireless communication. For example, It may include at least one of various wireless communication modules that can be connected to the Internet network in a wireless communication method such as Wi-Fi, Wireless broadband, Global System for Mobile Communication (GSM), Code Division Multiple Access (CDMA), Wideband Code Division Multiple Access (WCDMA), Universal Mobile Telecommunications System (UMTS), Time Division Multiple Access, LTE (Long Term Evolution), 4G mobile communication, 5G mobile communication, etc.

In addition, the communicator 130 may transmit the voice signal indicating the command sentence to the local speaker S, via the user terminal 200. For example, when the user terminal 200 is implemented as a mobile device, the user terminal 200 is connected to the hub-dialogue system 100 through an internet network and can be connected with a local area communication scheme such as Bluetooth communication with the local speaker S. When the user terminal 200 receives a voice signal indicating a command sentence from the hub-dialogue system 100, the user terminal 200 may transmit the received voice signal to the local speaker S.

According to an embodiment, the dialogue system 100 may be implemented as a server, and in this case, the components 110, 120, 130, and 140 of the dialogue system 100 may be provided in the server. However, it is also possible for some of the components 110, 120, 130, 140 of the dialogue system 100 to be provided in the user terminal 200.

Figure 6:
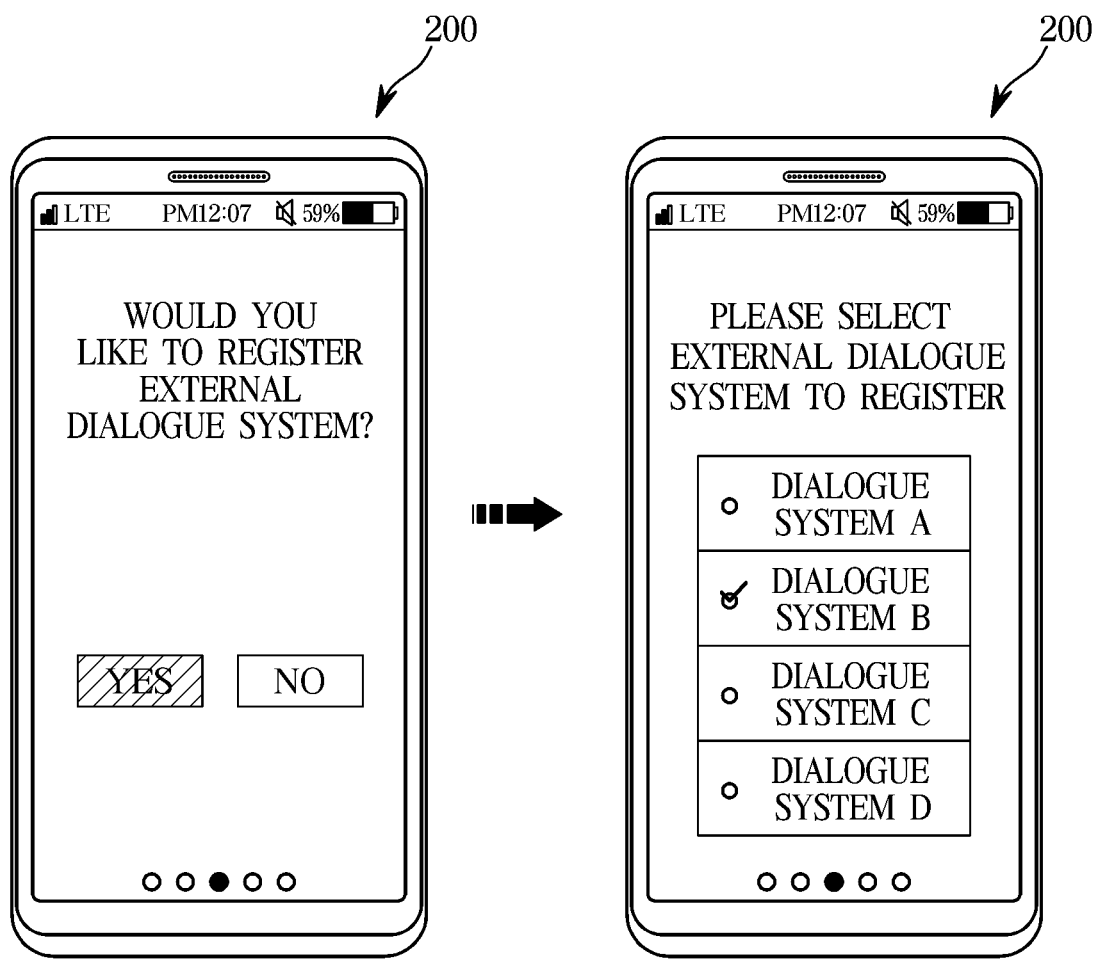
FIGS. 6 to 8 are diagrams for describing a process of registering an external dialogue system in a hub-dialogue system in accordance with embodiments of the present disclosure.
Figure 7:
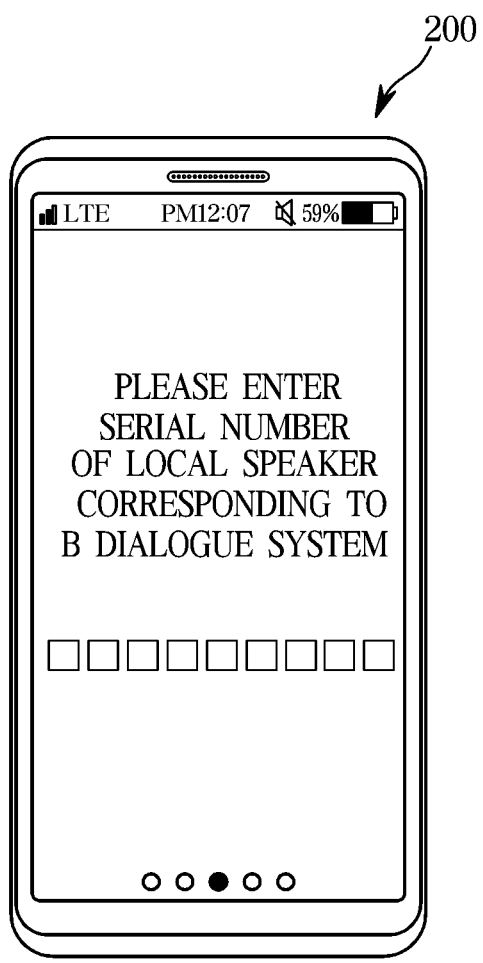
Figure 8:
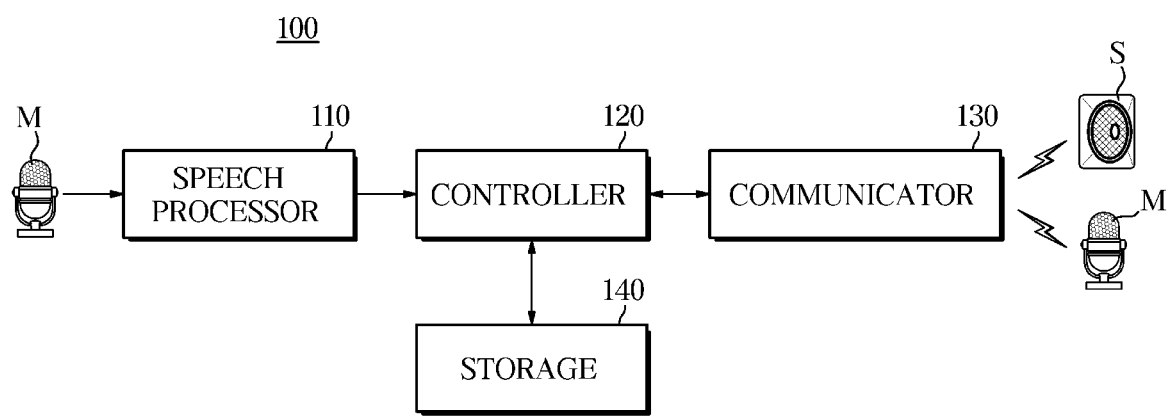

FIGS. 6 to 8 are diagrams for describing a process of registering an external dialogue system in a hub-dialogue system in accordance with embodiments of the present disclosure;

As described above, the hub-dialogue system 100 determines an external dialogue system corresponding to the user's intention, generates a command sentence suitable for the determined external dialogue system, and registers an external dialogue system at the hub-dialogue system 100 to input the generated command sentence into a microphone of the external dialogue system.

First, the local speaker S is placed at a position corresponding to the microphone of the external dialogue system to be registered by the user. For example, when the local speaker S is implemented as a small wireless speaker, the local speaker S may be attached to a microphone of an external dialogue system.

Referring to FIG. 6, the user may execute an application for accessing the hub-dialogue system 100 on the user terminal 200. The user may access the hub-dialogue system 100 by executing the corresponding application. The application may be downloaded and installed by the user or may be installed in the user terminal 200 by default.

The hub-dialogue system 100 may display a list of external dialogue systems that can be registered through the user terminal 200, and the user may select an external dialogue system to be registered from the displayed list.

As shown in FIG. 7, the hub-dialogue system 100 may request information about a local speaker S corresponding to an external dialogue system selected through the user terminal 200. For example, an input of a serial number for identifying the local speaker S may be requested.

The hub-dialogue system (100) receives information of the external dialogue system that user wants to register from user terminal 200 and local speaker information corresponding to the external dialogue system through the communicator 130.

In addition, the user may input the type of electronic device linked to the external dialogue system to be registered in the user terminal 200. Even when the type of the electronic device to be interlocked after the initial registration of the external dialogue system is added, the user may input the type of the electronic device added to the user terminal 200. The user terminal 200 may transmit the type of electronic device linked to the external dialogue system to the hub-dialogue system 100.

The hub-dialogue system 100 may build a table as shown in FIG. 4 described above based on the information received from the user terminal 200 and store it in the storage 140.

Meanwhile, the information regarding the command sentence corresponding to the user intention shown in FIG. 5 may be input in the form of a text or voice signal from the user at the time of registering the external dialogue system.

Alternatively, the hub-dialogue system 100 receives a test user utterance for registering a command sentence for each user's intention when registering an external dialogue system, and converts the user's speech into a voice signal and transmits to the local speaker S corresponding to the corresponding external dialogue system through the communicator 130.

As shown in FIG. 8, the hub-dialogue system 100 may further include a local microphone M for receiving a voice signal output from a speaker of an external dialogue system. Of course, the local speaker (S) and the local microphone (M) may be implemented integrally.

When the voice signal is output from the local speaker S, the corresponding external dialogue system may generate and output a system response according to the recognition result of the voice signal. The local microphone (M) receives the system response of the external dialogue system, and transmits the input system response to communicator 130.

The controller 120 may determine whether the voice signal can be recognized by an external dialogue system based on the input system response. For example, if the input system response corresponds to the user's intention included in the test user utterance, such as "Do you want to run the air conditioner?", It may be determined that the input user utterance is recognizable by the external dialogue system.

If it is determined that the test user utterance is recognizable by the external dialogue system, the controller 120 stores the sentence included in the user utterance as a command sentence corresponding to the user intention, as shown in FIG. 5.

For example, when a user registers an external dialogue system A 10, the user utters "turn on the air conditioner", then the hub-dialogue system 100 outputs the voice signal of "Turn on the air conditioner" through the local speaker A S_A, and then if the system response "Do you want to run air conditioning?" Is output from the external dialogue system A 10, as illustrated in FIG. 5, the controller 120 may store "turn on the air conditioner" as a command sentence corresponding to the user intention "air conditioner_on".

In addition, if it is determined that the test user utterance is not recognizable by the external dialogue system, the controller 120 may request the user speech again. The controller 120 converts the input user speech into a voice signal and transmits the same to the local speaker S through the communicator 130. The controller 120 may finally store a sentence included in a user speech recognized by an external dialogue system as a command sentence corresponding to a user's intention.

On the other hand, the above-described process may be performed at the first use after registering the external dialogue system in the hub-dialogue system (100).

Hereinafter, a control method of a hub-dialogue system according to an embodiment will be described. In implementing the control method of the hub-dialogue system according to an embodiment, the hub-dialogue system 100 according to the above-described embodiment may be used. Therefore, the contents described with reference to FIGS. 1 to 8 may be applied to the embodiment of the control method of the hub-dialogue system even if not mentioned otherwise, and a description of an embodiment of a control method of a hub-dialogue system described below may also be applied to the hub-dialogue system 100.

Figure 9:
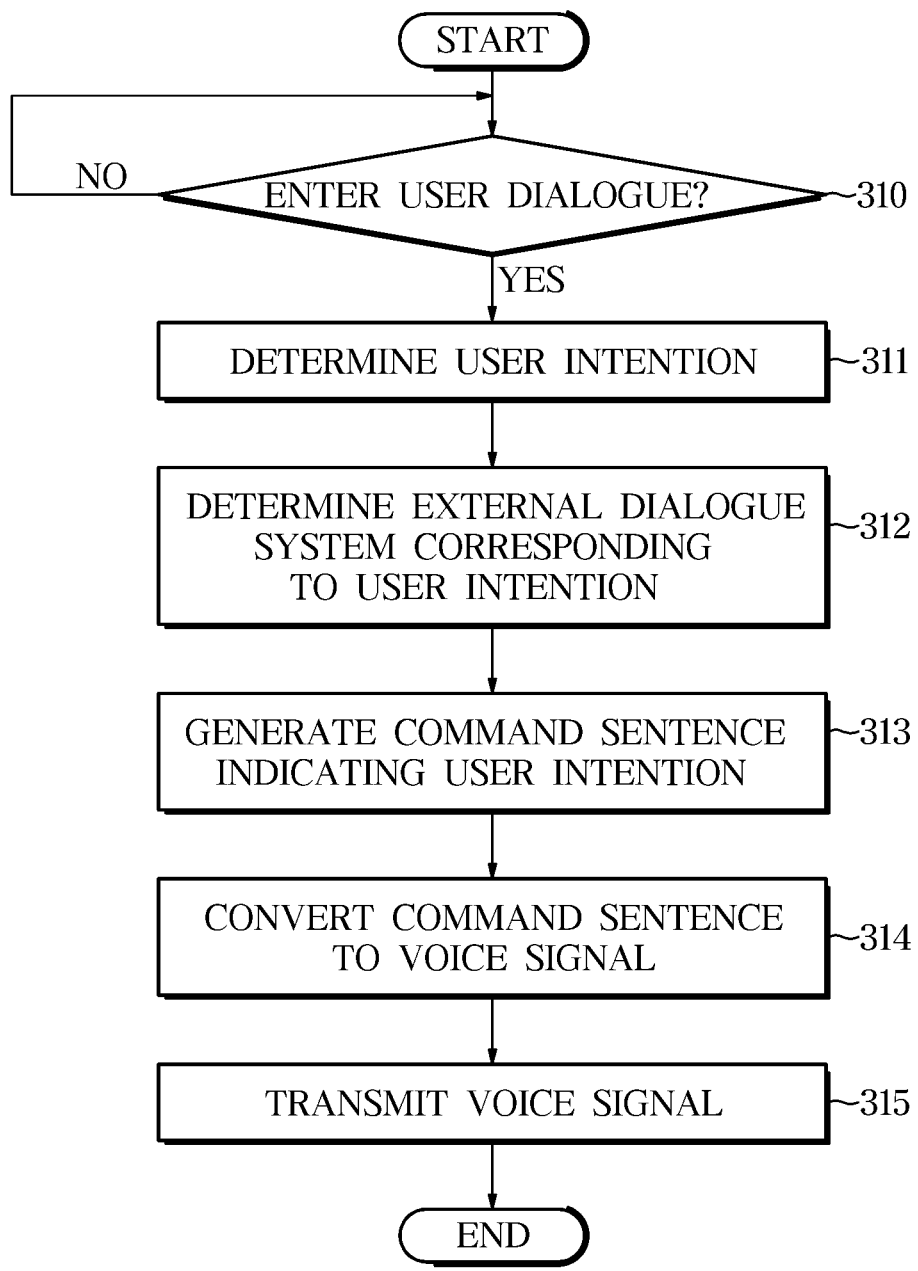
FIG. 9 is a flowchart illustrating a control method of a hub-dialogue system in accordance with embodiments of the present disclosure.

FIG. 9 is a flowchart illustrating a control method of a hub-dialogue system in accordance with embodiments of the present disclosure.

According to the control method of the hub-dialogue system illustrated in FIG. 9, when a user speech is input (Yes of 310), the user intention included in the input user speech is determined (311). The user speech may be input through a microphone provided in the user terminal 200 connecting the user with the hub-dialogue system 100, and the speech processor 110 of the hub-dialogue system 100 may determine the user's intention included in the user speech by applying speech recognition and natural language understanding technology.

An external dialogue system corresponding to a user's intention is determined from at least one external dialogue system registered in the hub-dialogue system (312). As described above with reference to FIGS. 6 and 7, the user may register at least one external dialogue system and an electronic device linked to the external dialogue system through the user terminal 200 in the hub-dialogue system 100. Based on the registered information, the hub-dialogue system 100 may construct a table in which a domain and an external dialogue system corresponding thereto are matched and stored in the storage 140, as shown in FIG. 4. The controller 120 may determine an external dialogue system corresponding to the user intention based on the table.

A command sentence indicating a user intention is generated (313). As described above with reference to FIG. 5, command sentences indicating user intentions may be matched and stored in the storage 140 for each user intention. The stored command sentence is a sentence that can be recognized by an external dialogue system corresponding to the user's intention. A process of storing the command sentence will be described later. The controller 120 may generate a command sentence indicating a user intention based on the information stored in the storage 140.

The command sentence is converted into a voice signal (314), and the voice signal is transmitted to the local speaker S corresponding to the external dialogue system (316). As described above, the local speaker S corresponding to the external dialogue system may be provided at a position where a voice signal output from the local speaker S may be input to a microphone of the external dialogue system. As a result, it is as if the user uttered a command sentence in the microphone of the external dialogue system A (10), Even if there is no separate alliance or contract with other external dialogue systems, various devices linked with other external dialogue systems can be controlled according to the user's intention.

Figure 10:
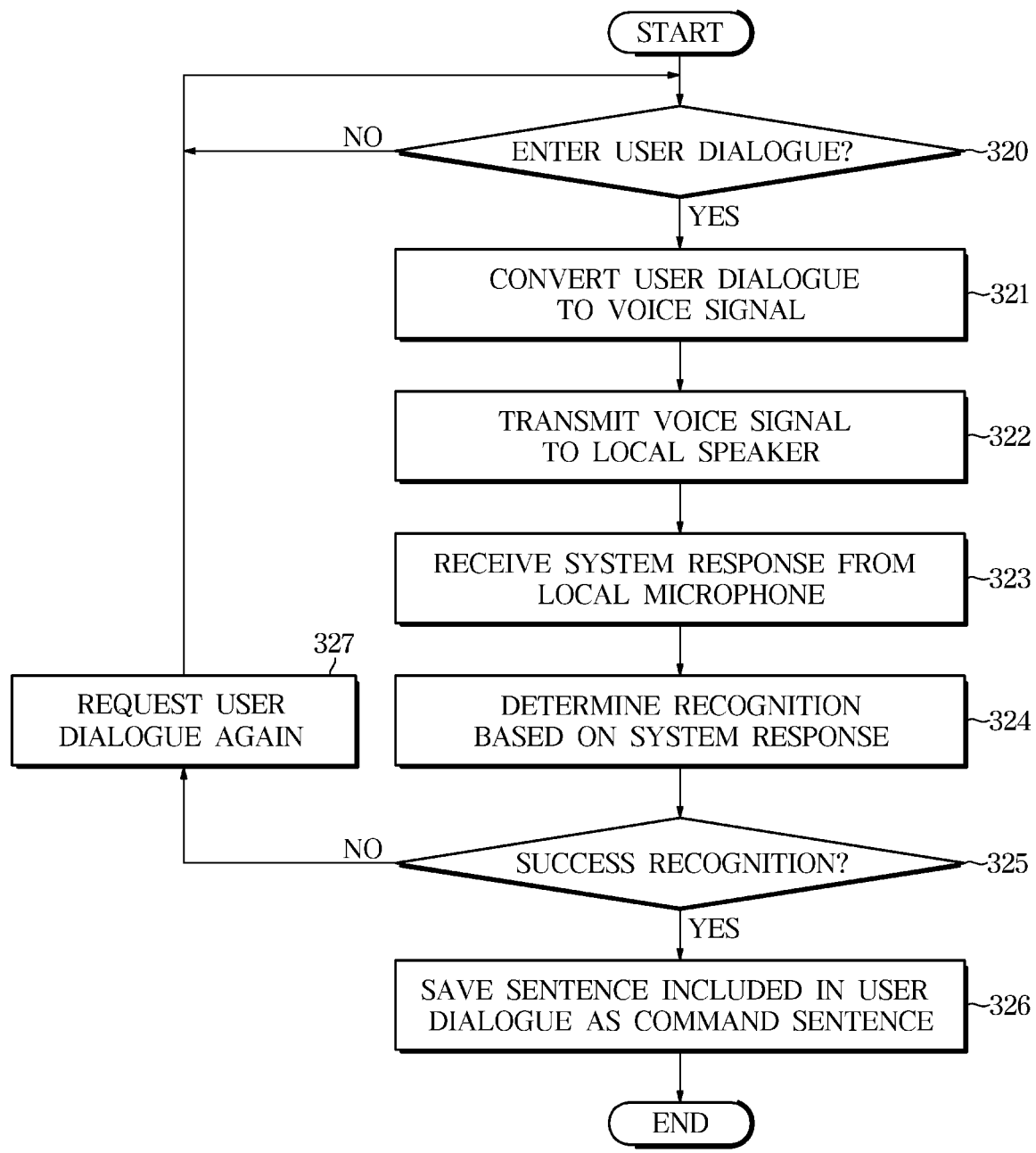
FIG. 10 is a flowchart illustrating a process of registering a command sentence corresponding to a user intention in the method of controlling a hub-dialogue system in accordance with embodiments of the present disclosure.

FIG. 10 is a flowchart illustrating a process of registering a command sentence corresponding to a user intention in the method of controlling a hub-dialogue system in accordance with embodiments of the present disclosure.

The process shown in FIG. 10 may be performed when registering an external dialogue system in the hub-dialogue system 100, or after registering an external dialogue system in the hub-dialogue system 100, the process may be performed when a user utterance for using the external dialogue system is input. However, in the following example for detailed description, it is assumed that the process of FIG. 10 is performed in the process of registering the external dialogue system with the hub-dialogue system 100.

According to the control method of the hub-dialogue system shown in FIG. 10, when user speech is input (Yes of 320), the user speech is converted into a voice signal (321), and the converted voice signal is transmitted to the local speaker S (322). Here, the user speech may be a test user utterance for registering a command sentence for each user's intention, and the local speaker S to which a voice signal is transmitted may be a local speaker corresponding to an external dialogue system currently undergoing a registration process.

A system response of an external dialogue system may be received from the local microphone M (323). As shown in FIG. 8, the hub-dialogue system 100 may further include a local microphone M for receiving a voice signal output from a speaker of an external dialogue system. Of course, the local speaker (S) and the local microphone (M) may be implemented integrally. When the voice signal is output from the local speaker S, the corresponding external dialogue system may generate and output a system response according to the recognition result of the voice signal. When the voice signal is output from the local speaker S, the corresponding external dialogue system may generate and output a system response according to the recognition result of the voice signal.

Based on the system response, it is determined whether the voice signal output through the local speaker S is recognizable by the external dialogue system (324). For example, the controller 120 may determine that the output voice signal is recognizable by an external dialogue system if the system response corresponds to a user's intention included in the user's speech.

If it is determined that the voice signal is recognizable by the external dialogue system (Yes of 325), the sentence included in the user speech is stored as a command sentence corresponding to the user intention (326), and if it is determined that it is not recognizable (NO in 325), the user utterance is requested again (327). The above-described process can be repeated until the external dialogue system can recognize the voice signal converted from the user's speech.

As another example, when registering an external dialogue system with the hub-dialogue system 100, the hub-dialogue system 100 asks the user for a command sentence indicating their intentions, and it is also possible to match the command sentence in the form of text or voice signal input from the user to the user's intention and store it in the storage.

According to the above-described hub-dialogue system and a control method thereof, a user inputs a speech for receiving a desired service without worrying about which dialogue system the device to be controlled is linked to, and selects external dialogue system that can provide the desired service, and generate and enters an appropriate command sentence in the selected external dialogue system.

In addition, by inputting the voice signal of the command sentence to the microphone of the external dialogue system through the local speaker, it is as if the user utters the command sentence to the microphone of the external dialogue system.

In this way, the hub-dialogue system can control various devices linked with other external dialogue systems according to the user's intention, even if there is no separate partnership or contract with other external dialogue systems.

In accordance with an embodiment, an electronic apparatus includes, a memory configured to store one or more programs and a processor configured to execute the stored programs, and wherein a program stored in the memory determines the user intention included in the user speech when the user speech is inputted, determines an external dialogue system corresponding to the user intention among the at least one external dialogue systems, generates a command sentence indicating the user intention, converts the command sentence to voice signal, and transmits the voice signal to a local speaker corresponding to the determined external dialogue system.

In addition, the program stored in the memory of the electronic apparatus is for executing the control method of the hub-dialogue system described above, and of course, each step included in the control method of the hub-dialogue system may be further included.

As described above, the disclosed embodiments have been described with reference to the accompanying drawings. Those skilled in the art will understand that the present disclosure can be implemented in a form different from the disclosed embodiments without changing the technical spirit or essential features of the present disclosure. The disclosed embodiments are exemplary and should not be construed as limiting.

It is an aspect of the disclosure to provide a hub-dialogue system, a hub-dialogue system control method, and an electronic apparatus for processing user utterances and generates and outputs command sentences suitable for an external dialogue system linked to the device to be controlled by the user, the user can control various devices using a single dialogue system.

What is claimed is:

1. A hub-dialogue system comprising:
    a speech processor configured to determine a user intention that is included in inputted user dialogue;
    a communicator configured to connect a local speaker corresponding to an external dialogue system through wireless communication; and
    a controller configured to determine the external dialogue system corresponding to the user intention from among a plurality of external dialogue systems, to generate a command sentence indicating the user intention, to convert the command sentence indicating the user intention to a voice signal, and to control the communicator to input the voice signal of the command sentence indicating the user intention to a speaker of the determined external dialogue system as a voice command for controlling the determined external dialogue system so that the external dialogue system can cause execution of a function in response to the voice command being output by the speaker.

2. The hub-dialogue system of claim 1, wherein the local speaker is provided at a position where the voice signal output from the local speaker can be input to a microphone of the corresponding external dialogue system.

3. The hub-dialogue system of claim 1 further comprising a storage configured to match and store the command sentence indicating the user intention.

4. The hub-dialogue system of claim 3, wherein the controller is configured to convert a user dialogue for registering the command sentence to the voice signal and to transmit the voice signal to the local speaker.

5. The hub-dialogue system of claim 4, wherein the communicator is connected with a local microphone corresponding to the external dialogue system and is configured to receive a system response outputted from the external dialogue system from the local microphone.

6. The hub-dialogue system of claim 5, wherein the controller is configured to determine whether the voice signal is recognizable by the external dialogue system based on the received system response.

7. The hub-dialogue system of claim 6, wherein the controller is configured to request user dialogue again when the voice signal is not recognizable by the external dialogue system.

8. The hub-dialogue system of claim 7, wherein the controller is configured to convert re-inputted user dialogue into the voice signal and to transmit the voice signal to the local speaker by controlling the communicator.

9. The hub-dialogue system of claim 6, wherein the controller is configured to store a sentence included in the user dialogue as command sentence corresponding to the user intention when the voice signal is recognizable by the external dialogue system.

10. The hub-dialogue system of claim 3, wherein the controller is configured to request a user command sentence indicating the user intention and to store the command sentence inputted by a user by matching the user intention when registering the external dialogue system with the hub-dialogue system.

11. A method of controlling a hub-dialogue system, the method comprising:
receiving user dialogue;
determining a user intention included from the received user dialogue;
determining an external dialogue system corresponding to the user intention from among a plurality of external dialogue systems registered in the hub-dialogue system;
generating a command sentence indicating the user intention;
converting the command sentence indicating the user intention into a voice signal; and
inputting the voice signal of the command sentence indicating the user intention to a local speaker of the determined external dialogue system as a voice command for controlling the determined external dialogue system so that the external dialogue system can cause execution of a function in response to the voice command being output by the local speaker.

12. The method of claim 11, wherein the local speaker is located at a position where the voice signal output from the local speaker can be input to a microphone of the corresponding external dialogue system, the method further comprising:
outputting the voice command from the local speaker;
receiving the voice command at the microphone; and
operating the external dialogue system based on the voice command received at the microphone.

13. The method of claim 11 further comprising matching and storing the command sentence indicating the user intention for at least one user intention.

14. The method of claim 13 further comprising:
converting the user dialogue for registering the command sentence to the voice signal; and
transmitting the voice signal to the local speaker.

15. The method of claim 14 further comprising receiving a system response output by the determined external dialogue system from a local microphone corresponding to the determined external dialogue system.

16. The method of claim 15 further comprising determining whether the voice signal is recognizable by the determined external dialogue system based on the received system response.

17. The method of claim 16 further comprising requesting user dialogue again when the voice signal is not recognizable by the determined external dialogue system.

18. The method of claim 16 further comprising storing a sentence included in the user dialogue as a command sentence corresponding to the user intention when the voice signal is recognizable by the determined external dialogue system.

19. The method of claim 13, wherein matching and storing the command sentence comprises requesting to a user command sentence indicating the user intention and storing the command sentence input by a user by matching the user intention when registering the determined external dialogue system with the hub-dialogue system.

20. An electronic apparatus comprising a memory storing a program and a processor configured to execute the stored program, wherein the stored program includes instructions to cause the memory to execute a method comprising:
determining a user intention included in an inputted user dialogue;
determining an external dialogue system corresponding to the user intention from among a plurality of external dialogue systems registered in a hub-dialogue system associated with the electronic apparatus;
generating a command sentence indicating the user intention;
converting the command sentence into a voice signal; and
inputting the voice signal of the command sentence indicating the user intention to a speaker of the determined external dialogue system as a voice command for controlling the determined external dialogue system so that the external dialogue system can cause execution of a function in response to the voice command being output by the speaker.

* * * * *